June 10, 1930.  H. A. SMITH  1,762,748
PHOTO ELECTRIC PHOTOMETER
Filed April 26, 1927
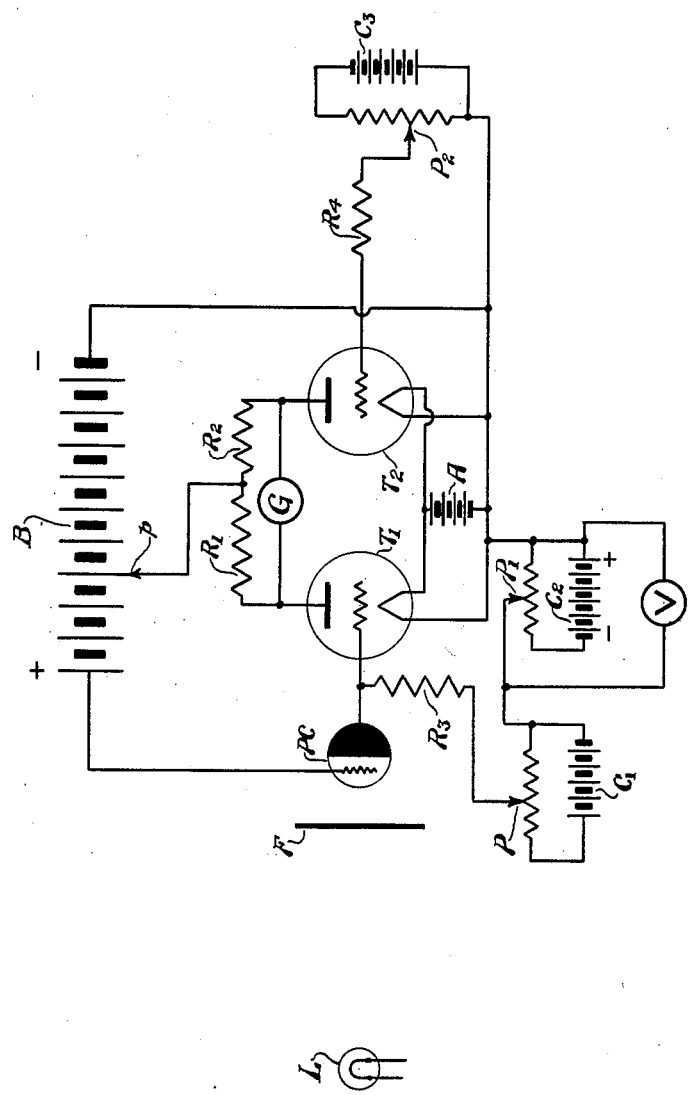
INVENTOR.
Hardwick Allen Smith
BY
ATTORNEY Patented June 10, 1930

1,762,748

UNITED STATES PATENT OFFICE

HARDICK ALLEN SMITH, OF NEW ROCHELLE, NEW YORK, ASSIGNOR TO ELECTRICAL TESTING LABORATORIES, INC., OF NEW YORK, N. Y., A CORPORATION OF NEW YORK

PHOTO-ELECTRIC PHOTOMETER

Application filed April 26, 1927. Serial No. 186,773.

My invention relates to an improved photometer employing a photo-electric cell and particularly to a new and improved method of using a photo-electric cell in photometry. The invention also involves the employment of a circuit and associated apparatus by which the method will be carried into effect. My improvements have the great advantage of requiring no highly sensitive electrical instruments of special construction and of using a circuit and a method of operation of such character that variations caused by changes in voltage, temperatures, etc. have little or no influence on the result.

In carrying my invention into effect I employ a photo-electric cell of standard and approved construction which is adapted to be influenced by light from the lamp to be measured, a suitable color filter being interposed between said light source and the cell in order that the response of the cell to light of different colors will be the same as that of the eye.

In connection with the photo-electric cell I utilize two amplifier tubes of the three-electrode type, said tubes being arranged in a circuit involving the principle of the Wheatstone bridge and being associated with instrumentalities for varying the voltage applied to the tubes so as to permit a direct reading to be secured of the light influencing the cell and thus indicating directly the light value of the lamp which is being measured, all as I will more fully hereafter describe and claim.

In order that the invention may be better understood, attention is directed to the accompanying drawing, forming a part of this specification, showing the preferred circuit arrangement for carrying my improved method into effect.

L represents the source of light which is to be measured, said source being ordinarily an incandescent lamp supplied with current of the desired fixed voltage. Light from the source L passes through a color filter F of suitable construction in order that the response of the cell to light of different colors will be the same as that of the eye.

P. C. indicates a photo-electric cell of any standard construction having an anode and a cathode. The anode of the cell is connected as shown to the plus terminal of the battery B and its cathode is connected to the grid of the three-electrode amplifier vacuum tube T1. A similar amplifier tube T2 is employed and the plate electrode of each tube is connected as shown through high resistors R1 and R2 to an intermediate point $p$ of battery B. The resistors R1 and R2 are of the same value and they are shunted by a galvanometer G in the neutral limb of the Wheatstone bridge.

The filaments of the two amplifier tubes T1 and T2 are connected in parallel as shown, and are supplied with current from battery A, the ordinary means (not shown) being employed to adjust the voltage of this battery and thus control the filament temperature. The negative terminal of battery B is connected as shown to the filaments of the two tubes.

One terminal of a high resistor R3 is connected to the cathode of the photo-electric cell, the other terminal thereof being connected to an adjustable potentiometer P associated with the battery C1 adapted to apply a fixed bias to the grid of the tube T1 as I will hereafter explain.

The potentiometer P is connected to a second potentiometer or potential divider P1 associated with the battery C2, whereby the voltage applied by the battery C2 can be varied at will. The positive terminal of the battery C2 is connected to the filament circuit of the two amplifier tubes as shown. A voltmeter V enables the value of the voltage applied by the battery C2 to the grid of the amplifier tube T1 to be measured.

The grid of the vacuum tube T2 is connected to the resistor R4 of the same value as the resistor R3 and thence to the potentiometer or potential divider P2 associated with the battery C3, the positive terminal of which is connected to the filament circuit of the two tubes.

In carrying my invention into effect with a circuit such as I have above described I proceed as follows:

With no light falling on the photo-electric cell from the source L and with the potential divider P1 so adjusted that no voltage from battery C2 is impressed on the grid of the tube T1, i. e. the voltmeter V indicating zero, the biasing voltage applied by battery C1 is so adjusted that the grid of the tube T1 has negative potential with respect to the filament and hence draws no current. This adjustment is preferably made at the point that is most sensitive to changes in the amount of the grid bias.

The bias applied to the grid of the second tube T2 is then adjusted by means of the potentiometer P2 to such value that the galvanometer G which balances the Wheatstone bridge indicates zero.

Light from the source L is now allowed to fall on the photo-electric cell through the filter F. The current which is then set up through the cell flows through the resistor R3 and the potential of the grid of the tube T1 is raised. The effect of this is to cause an apparent decrease in the resistance of the tube T1 and hence to throw the Wheatstone bridge out of balance as indicated by the deflection of the galvanometer G. The balance of the bridge is then restored by applying a voltage from battery C2 to the grid of the tube T1 by adjusting the potentiometer P1, such balance being indicated by the galvanometer G returning to zero. The amount of the voltage thus applied by the battery C2 is measured by the voltmeter V and this is equal to the increase in potential of the grid which has been caused by the effect of the light falling on the photo-electric cell.

With a properly constructed photo-electric cell the current which is passed through a fixed resistor in series with the cell such as R3 is proportional to the illumination of the cell. The voltage measured by voltmeter V then being proportional to the current through the fixed resistor R3, is proportional also to the illumination which the lamp L or other source produces on the cell. By the use of a standardized lamp the apparatus can be calibrated so that voltmeter readings are directly interpreted in terms of the light from the lamp L.

It will be seen that by the use of my invention it is possible to secure a direct reading of the light value emanating from a source to be measured and thus eliminate the human equation involved in comparing the effect of the lamp to be measured with that of a standard lamp, as is necessary with usual methods of photometry. At the same time the method is one in which the operation can be performed quickly and with a high degree of accuracy. Furthermore the results are not materially influenced by changes in voltage, temperature, etc., for the reason that any influence due to exterior causes will be balanced or counteracted in the Wheatstone bridge. It will finally be noted that with my apparatus I make use of ordinary vacuum tubes and standardized electrical instruments, thus doing away with highly sensitive electrical apparatus of special construction as ordinarily used with other methods of photometry.

Having now described by invention, what I claim as new therein, and desire to secure by Letters Patent, is as follows:

1. The method of determining the light value of a source of illumination which consists in adjusting the grid of a three-electrode amplifier tube so that it shall have a negative potential with respect to its filament, in similarly adjusting the grid of a second three-electrode amplifier tube having a bridge relation with respect to the first tube whereby said tubes will be in balanced relationship, in causing light from the source to be measured to fall upon a photo-electric cell, so as to generate a current flow which effects a voltage change in the first amplifier tube thereby unbalancing the same with respect to the second amplifier tube and in restoring the balance between said tubes by impressing a counteracting voltage on the grid of the first tube, whereby said counteracting voltage will be proportional to the illumination produced by the light source on the cell, substantially as set forth.

2. In a photometric apparatus, the combination of two three-electrode amplifier tubes arranged in a Wheatstone bridge and normally balanced, a photo-electric cell adapted to be influenced by the light to be measured and thus effect a voltage change in one of said tubes so as to unbalance the tubes, and means for producing a counterbalancing voltage so as to again balance the tubes, the value of the counterbalancing voltage being proportional to the illumination produced by the light source on the photo-electric cell, substantially as set forth.

3. In a photometric apparatus, the combination of two three-electrode amplifier tubes arranged in a Wheatstone bridge so as to be normally balanced, means for producing a negative potential on the grid of each tube with respect to its filament, a photo-electric cell connected with the grid of the first tube, a high resistor in series with said cell, means for impressing a counterbalancing voltage on the grid of the first tube and a voltmeter for measuring the value of the counterbalancing voltage, substantially as set forth.

4. In a photometric apparatus, the combination of two three-electrode amplifier tubes arranged in a Wheatstone bridge and normally balanced, a galvanometer for indicating conditions of balance or unbalance thereof, a photo-electric cell excited by light of the source to be measured and effecting a voltage change in the first tube so as to unbalance the two tubes, means for neutralizing such voltage change so as to again balance the two tubes and a voltmeter for indicating the value of the neutralizing voltage, substantially as set forth.

5. The method of determining the light value of a source of illumination by impressing upon the grid of a three electrode audion in one arm of a balanced electrical bridge an electromotive force produced by the flow of current from a photoelectric cell generated by exposing said cell to the light of said source, neutralizing said electromotive force by impressing upon said grid a counter electromotive force and determining in terms of light the value of this counter electromotive force, substantially as set forth.

6. In a photometric apparatus, the combination of a Wheatstone bridge having a three electrode audion in one arm and means for balancing the audion in another arm, means for impressing a desired potential upon the grid of the audion, a photoelectric cell connected to the grid of the audion, means for impressing a voltage upon the grid to counter balance that impressed upon the grid by the photoelectric cell and means for measuring the value of the counter balancing voltage, substantially as set forth.

7. In a photometric apparatus, the combination of a Wheatstone bridge having a three electrode audion in one arm and a resistance in another, so arranged that they are normally balanced, means for impressing a desired potential upon the grid of the audion, a photoelectric cell connected to the grid of the audion, means for impressing a voltage upon the grid to counter balance that impressed upon the grid by the photoelectric cell and means for measuring the value of the counter balancing voltage, substantially as set forth.

HARDICK ALLEN SMITH.